United States Patent [19]
Sekiguchi et al.

[11] Patent Number: 5,553,207
[45] Date of Patent: Sep. 3, 1996

[54] METHOD OF AND APPARATUS FOR REGION EXTRACTION IN THREE-DIMENSIONAL VOXEL DATA

[75] Inventors: Hiroyuki Sekiguchi, Kawasaki; Koichi Sano, Yokohama; Tetsuo Yokoyama, Tokyo, all of Japan

[73] Assignee: Hitachi, Ltd., Tokyo, Japan

[21] Appl. No.: 249,045

[22] Filed: May 24, 1994

Related U.S. Application Data

[63] Continuation of Ser. No. 888,539, May 26, 1992, abandoned.

[30] Foreign Application Priority Data

May 27, 1991 [JP] Japan .................................. 3-120794

[51] Int. Cl.$^6$ ...................................................... G06F 15/00
[52] U.S. Cl. ........................... 395/124; 395/141; 382/131; 382/154
[58] Field of Search ...................... 395/124–127, 395/129, 133, 155, 139, 141; 382/131, 154

[56] References Cited

U.S. PATENT DOCUMENTS 4,751,643  7/1988  Lorensen et al. ....................... 364/414

FOREIGN PATENT DOCUMENTS 354026A    3/1989  European Pat. Off. .
A0354026   2/1990  European Pat. Off. .
A0424912   5/1991  European Pat. Off. .

OTHER PUBLICATIONS

*Systems and Computers in Japan*, "Interactive 3-Dimensional Segmentation Method Based on Region Growing Method", Sekiguchi, et al., vol. 25, No. 1, Jan. 1994.

Primary Examiner—Raymond J. Bayerl
Assistant Examiner—Huynh Ba
Attorney, Agent, or Firm—Antonelli, Terry, Stout & Kraus

[57] ABSTRACT

In a region extraction to be achieved by a concatenated region expansion processing, to improve reliability of extraction results and to reduce loads imposed on the operator, when a region other than an objective region is extracted as a result of the region extraction, a point belonging to the region other than the objective region is specified in a three-dimensional display image to execute deletion of the overflow region.

9 Claims, 18 Drawing Sheets

EXAMPLE OF ORIGINAL IMAGE DATA

FIG.2

EXTRACTION HISTORY DATA

|   |   |   |   |   | 15 | 14 | 13 | 12 | 13 | 14 | 15 |   |   |
|---|---|---|---|---|----|----|----|----|----|----|----|---|---|
|   |   |   | 15 | 14 | 13 | 12 | 11 | 12 | 13 | 14 | 15 |   |   |
|   |   | 15 | 14 | 13 | 12 | 11 | 10 | 11 | 12 | 13 | 14 | 15 |   |
|   | 14 | 13 | 12 | 11 | 10 | 9  | 10 | 11 | 12 | 13 | 14 | 15 |   |
|   |    | 12 | 11 | 10 | 9  | 8  | 9  | 10 | 11 | 12 |    |    |   |
|   |    | 11 | 10 | 9  | 8  | 7  | 8  | 9  |    |    |    |    |   |
|   |    |    |    | 8  | 7  | 6  |    |    |    |    |    |    |   |
|   |    |    |    |    | 5  | 4  |    |    |    |    |    |    |   |
|   |    |    |    | 5  | 4  | 3  | 4  | 5  | 6  |    |    |    |   |
|   |    |    | 6  | 5  | 4  | 3  | 2  | 3  | 4  | 5  | 6  |    |   |
|   |    |    | 5  | 4  | 3  | 2  | 1  | 2  | 3  | 4  | 5  | 6  |   |
| 201 |  |    | 4  | 3  | 2  | 1  | ⓪ | 1  | 2  | 3  | 4  | 5  |   |
|   |    | 6  | 5  | 4  | 3  | 2  | 1  | 2  | 3  | 4  | 5  | 6  |   |
|   |    | 7  | 6  | 5  | 4  | 3  | 2  | 3  | 4  | 5  | 6  | 7  |   |
|   |    | 8  | 7  | 6  | 5  | 4  | 3  | 4  | 5  | 6  | 7  |    |   |
|   |    |    | 8  | 7  | 6  | 5  | 4  | 5  | 6  | 7  | 8  |    |   |
|   |    |    | 9  | 8  | 7  | 6  | 5  | 6  | 7  | 8  |    |    |   |
|   |    |    |    |    |    | 7  | 6  | 7  |    |    |    |    |   |

FIG.3 SPECIFICATION OF DELETION REGION ON THREE-DIMENSIONAL IMAGE

FIG. 4 EXPANSION PROCESSING FOR EXTRACTION HISTORY DATA

Pn : PARENT (EXTRACTION STAGE=11)
Cn : CHILD (EXTRACTION STAGE=12)

FIG.6 REGION EXTACTED UP TO CONNECTION POINT (EXTRACTION STAGE = 6)

FINAL EXTRACTION RESULT

FIG. 9  INITIAL STATE OF RE-EXTRACTION

FIG. 10 EXTRACTION HISTORY DATA (2)

FIG.11 CHECK FOR CONCATENATED FEATURE OF EXPANSION POINT

CONFIGURATION OF APPARATUS

FIG.16 ONE-STAGE REVERSE-DIRECTIONAL REGION EXPANSION FLOW

EXTRACTION PROCESSING FLOW

EXTRACTION PROCESSING FLOW

METHOD OF AND APPARATUS FOR REGION EXTRACTION IN THREE-DIMENSIONAL VOXEL DATA

CROSS-REFERENCE TO RELATED APPLICATIONS

This application is a continuation of Ser. No. 07/888,539, filed May 26, 1992, now abandoned.

The present application relates to subject matter described in application Ser. No. 602,817 filed on Oct. 24, 1990 entitled "REGION EXTRACTING METHOD AND THREE-DIMENSIONAL DISPLAY METHOD" by Hiroyuki SEKIGUCHI, Koichi SANO and Tetsuo YOKOYAMA and to application Ser. No. 797,893 filed on Nov. 26, 1991 entitled "3-DIMENSIONAL IMAGE PROCESSING METHOD" by Koichi SANO, Hiroyuki SEKIGUCHI and Tetsuo YOKOYAMA.

BACKGROUND OF THE INVENTION

The present invention relates to a method of and an apparatus for processing multi-dimensional data, and in particular, to a method of and an apparatus for achieving a region extraction efficient for conducting an individual internal organ extraction, which is essential when presenting a three-dimensional display of individual internal organs by use of three-dimensional digital data attained through a shooting operation by an MRI, an X-ray CT, and the like.

Known examples related to the present invention have been described in the following references (1) to (3).

(1) Azriel Rosenfeld, "Digital Picture Processing"

(2) U.S. patent Ser. No. 07/602817

(3) U.S. patent Ser. No. 07/797893

Methods of extracting a particular region from given data have commonly been classified into two large groups.

①  Method of classifying regions according to a property (for example, density) of each pixel thereof ②  Method of extracting regions by use of spatial continuity thereof.

For example, in a case where a bone region is extracted from an X-ray computer tomography (CT) image, since the pixel values (CT values) of the bone region are higher than those of the other regions, the method ① above can be utilized. On the other hand, in the image attained by a magnetic resonance imaging (MRI) system, the individual regions cannot be easily identified depending on pixel values, and hence the extraction is carried out according to the method ② above.

As specific methods associated with the method ②, there have been well known an extraction method called "edge trace" achieved by tracing a region boundary and an extraction method called "region growing" accomplished by expansion of a concatenated region. Results of the extraction conducted according to the edge trace method are attained as boundary lines or surfaces; consequently, this method is suitable for a high-speed three-dimensional display using a surface model. On the other hand, the boundary is likely to be interrupted due to noises or the like. In consequence, a correction operation is inevitably required to be carried out by the operator on the actual image data.

In contrast therewith, according to the region growing method, the concatenated region is expanded from an internal portion of a region to a periphery thereof. In the above reference (1), a basic method of region growing has been described. In this method, the region expansion, which is hindered by noises in the edge trace method, can be achieved without such a hindrance and can be easily applied to three-dimensional data. In consequence, the extraction method using the region growing technology is considered to be appropriate for the MRI three-dimensional image.

In the region growing method, the contour and shape of the extraction region vary depending on an extraction (expansion) condition established to judge a concatenation feature. Consequently, in order to increase reliability of extraction, it is necessary to optimize the expansion condition for each image and each extraction objective region. In the reference (2) above, there has been disclosed a method in which reliability of extraction processing is improved by employing an expansion condition including a combination of a local condition and a global condition.

In the region growing method, after a growth start point and a judge reference are supplied at an initiation point thereof, there is not inherently required any human power. This is most ideal as for automation of extraction. However, according to this method, when the expansion point once enters another region, the extraction is commenced in the entered region and hence the operation achieved only by the operation leads to a problem of reliability. Actually, even when the region growing method is directly applied to image data containing noises and having non-uniform density, a good result is rarely expected.

In the reference (3) above, there has been described a support method which can be considered to be effective for improvement of extraction reliability and which is achieved by an operator for the region growing method. In this method, an extraction process of the region growing operation for the three-dimensional voxel data is continuously monitored on a three-dimensional display image such that when the expansion point enters a region other than an objective region, the region expansion is immediately stopped so as to delete the region by a function to correct three-dimensional voxel data.

The most difficult problem of the concatenated region expansion method including the region growing method as its representative method is that when the extraction objective region (to be referred to as "an objective region" herebelow) is concatenated even via a point with a region (to be referred to as "an external region" herebelow) external with respect to the objective region, the expansion point may enter the external region and the region extraction is commenced. As methods of preventing the expansion point from entering the external region, there have been considered several ideas as follows.

(1) Setting more a severe judgement reference (expansion condition) of concatenation feature When the expansion condition of the concatenation feature is set to be more severe, the probability of the expansion point entering the external region from the extraction objective region is accordingly increased. However, when the judgement reference is set to be more severe, it becomes more difficult to extract the entire objective region. To overcome this difficulty, there have been considered the following methods (reference is to be made to reference 2).

①: A plurality of judgement references are established to conduct judgement of the expansion point in a multilateral manner.

②: The region of extraction data is uniformly expanded toward its periphery.

(2) Correcting data being subjected to concatenated region expansion

In the final result of extraction, the overflow region has grown to a considerable size; consequently, to remove the overflow region through a correction job is almost impossible. In order to minimize the deletion job, the overflow portion is deleted at a point of time when the expansion point enters the external region, namely, when the overflow region is not yet so large. After the overflow region is thus separated from the objective region, only the objective region can be extracted through the region expansion thereafter. (Reference is made to Article 3).

SUMMARY OF THE INVENTION

The present invention has been devised to further improve the above technology and an object thereof is to provide a method of and an apparatus for processing multi-dimensional data capable of minimizing the human operation to be achieved for the extraction processing to guarantee reliability of extraction.

The above object of the present invention is attained by a multi-dimensional data processing method in which a region extraction is conducted on multi-dimensional digital data characterized in that when a region other than an objective region is extracted as a result of the region extraction, a point belonging to the region is specified, thereby executing a deletion processing of the area other than the objective region Furthermore, there is provided a multi-dimensional data processing apparatus in which a region extraction is conducted on three-dimensional voxel data by use of a concatenated region expansion processing so as to present a three-dimensional display of the extraction objective region. The present invention comprises means for storing therein extraction history data indicating a point of extraction time for each point of the extraction objective region, three-dimensional display means for referencing the extraction history data and thereby outputting a three-dimensional display image of the extraction objective area at an arbitrary point of time, means for indicating as a starting point of a subsequent expansion processing a point within the extraction objective region, means for extracting an inside of a region to which the indication point belongs by using a concatenated region expansion method for the extraction history data, means for displaying the extracted region on a three-dimensional image, means for deleting the region extracted by said extracting means from the three-dimensional voxel data or registering again the region as a non-display region, and means for executing again an extraction processing of the objective region by the concatenated region expansion on the three-dimensional voxel data from which the region is thus deleted.

BRIEF DESCRIPTION OF THE DRAWINGS

These and other objects and advantages of the present invention will become apparent by reference to the following description and accompanying drawings wherein:

FIG. 2 is a diagram showing extraction history data for the original image data of FIG. 1;

DESCRIPTION OF THE PREFERRED EMBODIMENTS

Figure 1:
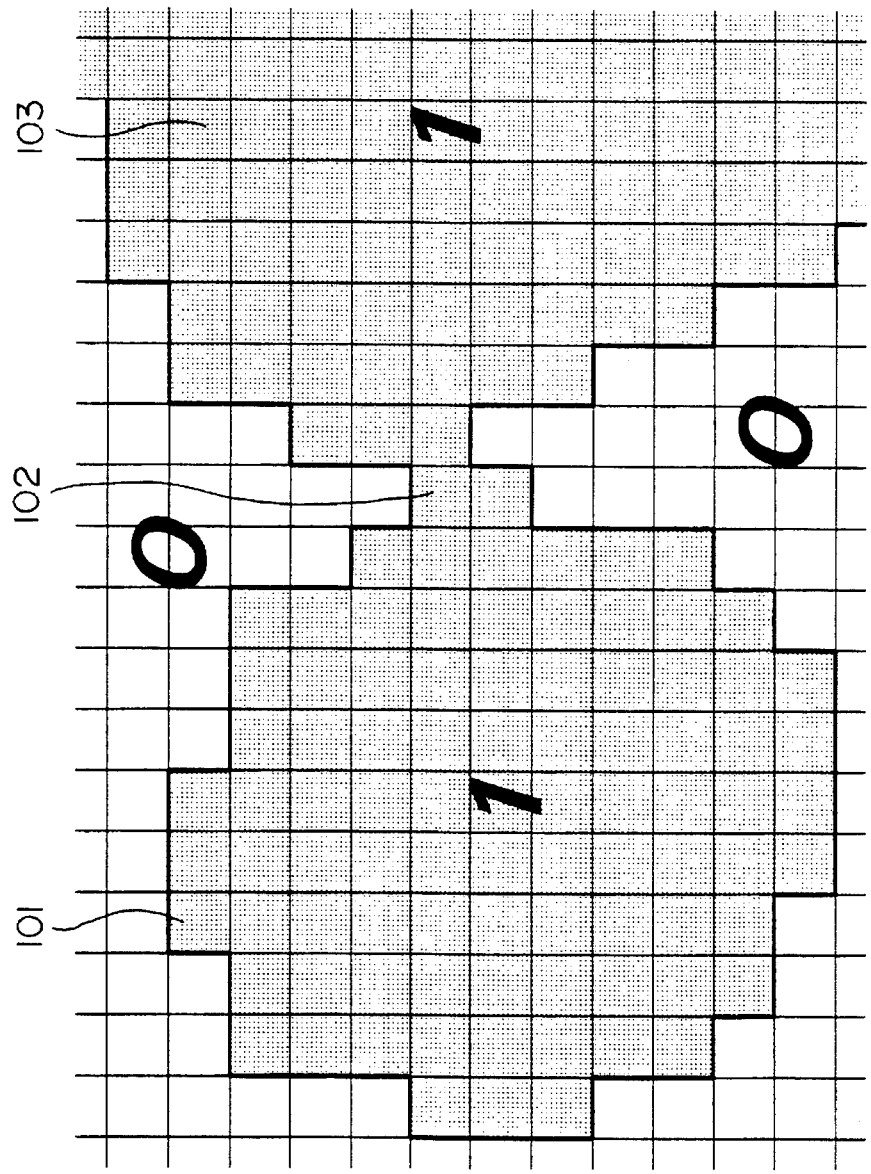
FIG. 1 is a schematic diagram showing an example of original image data useful for explaining operation of the present invention.

First, description will be given of the principle of the present invention.

As described above, in the extraction method by the concatenated region expansion processing, when the expansion point enters the external region other than the objective region, a completely wrong extraction result is attained. In particular, for images attained by the X-ray, CT and MRI apparatuses, the phenomenon of the overflow may easily occur due to influence from the distortion of image, noises, etc. of the apparatus. Consequently, to guarantee reliability of extraction, the operator is required to take some support actions for the extraction processing. Naturally, the amount of the required support operations considerably influence the practicality of the extraction processing in the clinical field. The primary object of the present invention is to attain a high extraction reliability with a minimal amount of support jobs. Description will now be given of means disposed for the purpose and operations thereof.

The overall extraction processing flow in the multi-data processing method according to the present invention will be shown in steps ① to ⑥ below. In this regard, the main contents of the present invention relate to processing ④ of removing the overflow region.

①: The operator sets an expansion starting point in the objective region.

②: The concatenated region expansion is executed in the objective region beginning from the starting point.

③: The extraction process is monitored on the three-dimensional display image such that when a region clearly overflowing into the external region is detected, the extraction processing is stopped.

④: The operator sets an expansion starting point in the overflow region.

⑤: The concatenated region expansion is initiated from the starting point to extract the overflow region.

⑥: The overflow region is indicated in the three-dimensional display image.

⑦: The operator visually checks the three-dimensional display image to delete the region if the extracted region is actually the overflow region.

⑧: Until the overall objective region is extracted, the processing steps ② to ⑥ are repeatedly executed.

In this connection, in order for the operator to conduct a necessary processing on an intermediate result of the extraction, there are required means for monitoring the extraction process and means for stopping the extraction processing when an overflow region appears in the image being monitored. Particularly, in a case where the extraction processing is conducted on the three-dimensional voxel data, there is necessitated, as disclosed in reference (3) above, a function for outputting the extraction region as a three-dimensional display image in a real time manner. Incidentally, a detailed description of these means and method of implementing the means will be omitted herein.

According to the present invention, in order to achieve the processing steps ④ to ⑦ for the "deletion of the overflow region" above, new functions are disposed as follows.

(1) Function for achieving a region extraction by the concatenated region expansion each time a point is extracted, namely, with an extraction history set as an extraction.

(2) Function for presenting, based on the extraction history data, a three-dimensional display of a region extracted at an arbitrary point in time.

(3) Three-dimensional coordinates indication function for specifying a point belonging to the overflow region by using the three-dimensional display image.

(4) Region extracting function for extracting, based on the extraction history data, an overflow region in a direction toward a lower extraction point according to the concatenated region extraction method.

(5) Region extracting means of extracting, based on the extraction history data, regions having an identical extraction point among the overflow regions according to the concatenated region extraction method.

(6) Function for checking, in each expansion stage of the concatenated region expansion, a concatenation feature of a new region thus expanded so as to acquire a concatenated region.

(7) Function for examining the number of expansion points in each extraction stage during the concatenated region expansion and deciding whether or not the expansion point is a connection part between the extraction objective region and the overflow region.

(8) Function for extracting the entire overflow region by a region expansion in the overflow region beginning from the connection part.

(9) Function for displaying, in an superimposing manner, the overflow region onto the three-dimensional display image.

(10) Function for deleting the overflow region from the original data or assigning an invisibility attribute to each pixel in the overflow region.

(11) Function in which the region extraction achieved by the region extraction function (1) is monitored by the three-dimensional display function (2) such that when the overflow region appears, the region extraction is stopped and the overflow region to be deleted is specified by the three-dimensional coordinate indication function (3), the overflow region is extracted by the functions (4) to (9), the deletion is conducted by the function (7), and the functions above are repeatedly executed.

(12) Function in which, after the connection part identified by the functions (4) to (7) is deleted or is set as an expansion inhibition region, the extraction stage is restored to a point of occurrence of the connection part and then the extraction processing is again initiated by the region extraction function (1).

The operations (1) to (11) respectively associated with the above functions (1) to (11) will be described by reference to FIGS. 1 to 8.

FIG. 1 shows an example of original image data on which the extraction processing is to be conducted. The actual object of the present invention is multi-value three-dimensional voxel data; however, for simplification of explanation, description will now be given of the operations accomplished for two-dimensional binary data.

In FIG. 1, a shaded portion has a value "1" and any other portion has a value "0". A region 101 is an objective region to be extracted. A region 103 not belonging to the objective region is connected to the region 101 via a connection part 102. Consequently, when the concatenated region expansion method is employed, the region 103 is also extracted as an overflow region.

(1) In a region extraction by the conventional concatenated region expansion method, a result therefrom is expressed by binary data representing whether or not each pixel belongs inside the extraction region or by probability of belonging thereof to the extraction region. In the region expansion processing first conducted on the objective region according to the present invention, there is output as a result therefrom the serial expansion number of the point relative to that of the initial point. The number is stored as attribute data for each pixel. The attribute data will be referred to as "extraction history data" hereinbelow.

FIG. 2 shows an extraction result (extraction history data) obtained by a concatenated region expansion accomplished on the data of FIG. 1 with a point 201 within the objective region set as the starting point. A numeral assigned to each pixel denotes a point in time when the pixel is extracted.

From the extraction history data, there can be attained an extraction result at an arbitrary point in time of the extraction process. In addition, it is also possible to trace the extraction process in the reverse direction. Particularly, due to the reverse-directional tracing feature, an overflow region can be automatically extracted. The extraction processing will be described in detail in operation (4) and the subsequent items.

(2) In a case where the extraction region overflows into an external region, the extraction is required to be stopped at an appropriate point in time. However, it is difficult to automatically decide the interruption time; consequently, the judgement is made by the operator in this example. There is provided observation means necessary for the operator to conduct the judgement. Namely, with the observation means, the user can check intermediate processes of the region expansion.

Since a three-dimensional region cannot be directly observed on a two-dimensional display, there is required a function for presenting the extraction region as a three-dimensional image. In addition, to observe the behavior of growth of the region, the extraction region continuously growing through the processing is required to be successively presented as a three-dimensional image. Moreover, when the image viewed only from a fixed direction is employed, an overflow which may occur on a side opposite to a side related to the fixed direction of viewpoint cannot be confirmed. Consequently, there are necessitated a function to change a point of view of the image display when necessary and a function to simultaneously display images viewed from a plurality of directions.

(3) In the overflow region deletion, there is first required means for indicating a deletion objective region. In the region indication, which will be described in operation (4) below, the indication point need not be necessarily set to a central portion of the region or to a point having a representative pixel value. Namely, only the coordinates of an arbitrary point need be specified within the overflow region. With this provision, the indication point can be directly supplied in the three-dimensional image. This is quite effective to reduce operation loads imposed on the operator.

Figure 3:
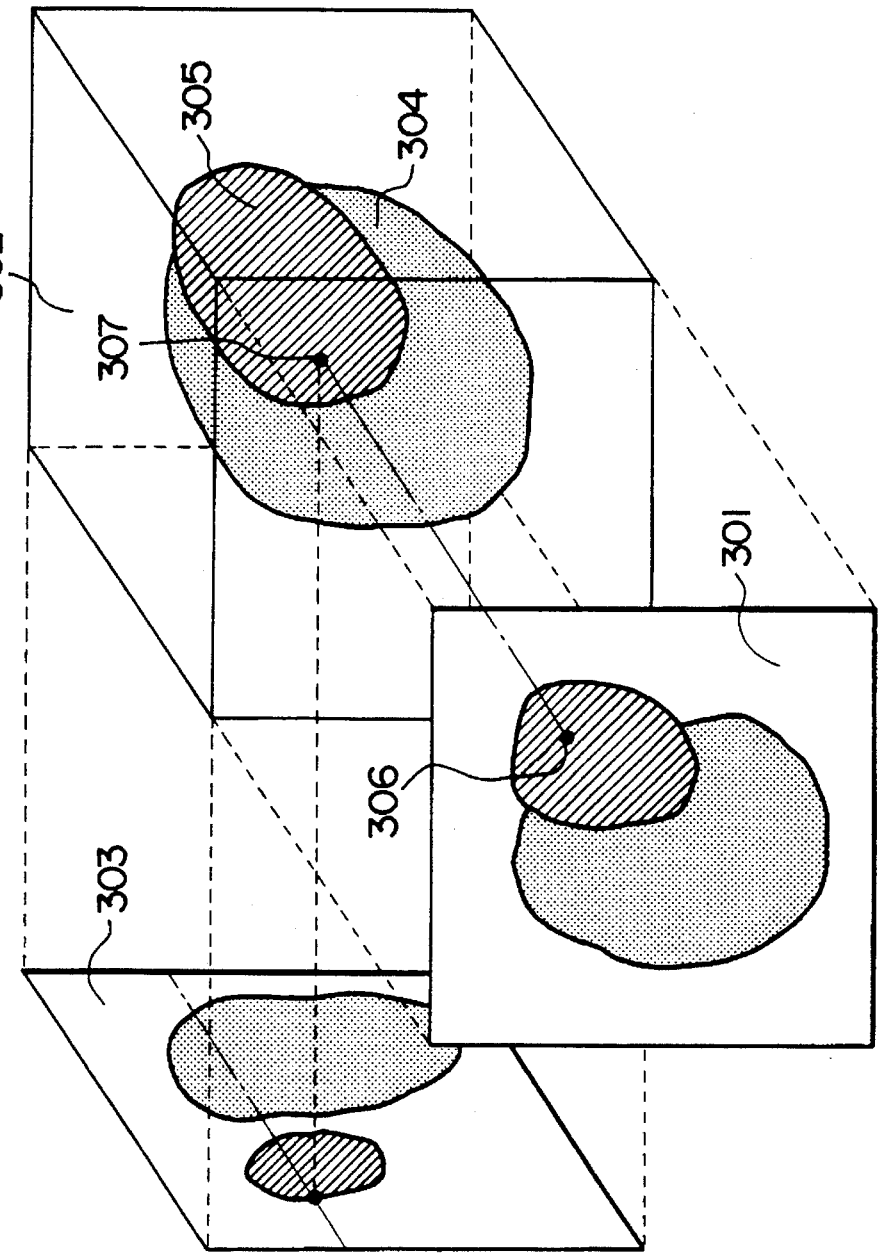
FIG. 3 is an explanatory diagram for explaining a method of specifying an overflow region in a three-dimensional display image.

FIG. 3 is a diagram useful for explaining a method of setting a starting point in a three-dimensional display image. In this diagram, a numeral 302 denotes a three-dimensional display image data space and numerals 304 and 305 respectively designate an objective region and an overflow region in the data space. A point 306 within the overflow region specified in the three-dimensional display image 301 is designated as a point 307 on a surface of an overflow region in the three-dimensional space.

(4) The region expansion to trace the extraction points of time in the reverse direction is carried out as follows. Namely, reference is made to extraction history data of an expansion starting point and points adjacent thereto. When an extraction stage of the expansion starting point is less than that of the adjacent point by one, the adjacent point is set as a new expansion starting point.

In this region expansion, the processing is sequentially accomplished in any case through regions as follows, namely, an overflow region, a connection part, and an objective region. Consequently, when the expansion point is in the connection part between the overflow and objective regions, it is considered that the expansion point is missing from all other locations.

(5) Whether or not the expansion point reaches the connection part is judged depending on an increase or decrease in the number of expansion points, which will be described in operation (7) below. When there is adopted a recursive expansion processing in which the respective expansion points produced from an expansion starting point in turn create expansion starting points, the expansion of the region is enhanced and hence the increase or decrease in the number of expansion points becomes more clear. Moreover, when the expansion point enters from the connection part into the objective part, the number of expansion points is abruptly increased, which considerably facilitates identification of the connection part.

The recursive expansion processing is carried out as follows. Namely, the system references extraction history data of an expansion point and points adjacent thereto. When an extraction stage of any one of the adjacent points is more than that of the expansion point by one, the adjacent point is set as a new expansion starting point.

Figure 4:
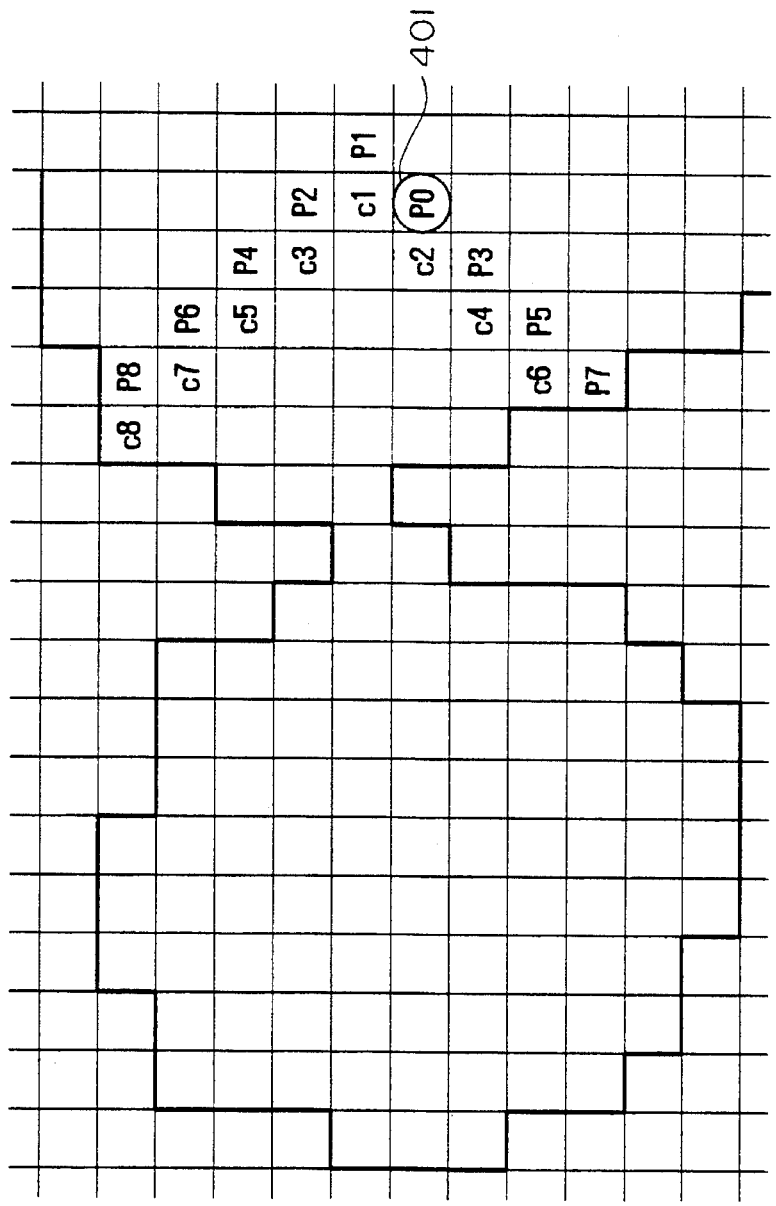
FIG. 4 is an explanatory diagram useful for explaining expansion processing achieved for extraction history data of FIG. 2.
Figure 5:
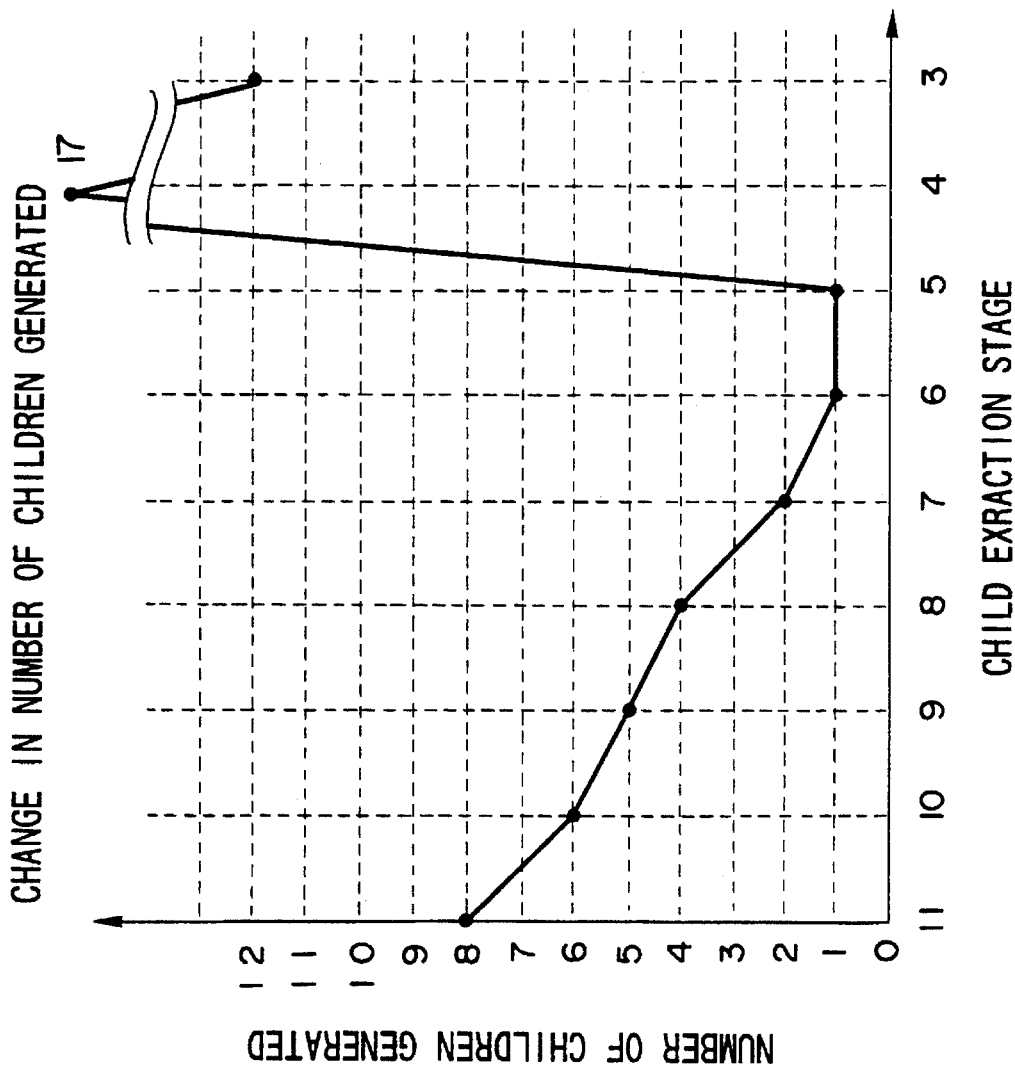
FIG. 5 is a diagram showing a change in the number of expansion points generated in an expansion process.

Referring next to FIGS. 2 and 4, description will be given of a stage of the region expansion carried out by the means of operations (4) and (5).

FIG. 4 shows the first stage of the expansion processing. The starting point is set to P0 (401) in this diagram. The point P0 is extracted in the 12th operation of the region extraction processing (to be referred to as "extraction stage 12" hereinbelow).

First, the first expansion starting point P0 generates expansion points c1 and c2 at points of extraction stage 11 adjacent thereto. The point c1 generates expansion starting points P1 and P2 at points of extraction stage 12 adjacent thereto and the point c2 similarly generates an expansion starting point P3. Subsequently, the new expansion starting point P2 thus generated creates an expansion point c3, which in turn produces new expansion points. Finally, the expansion points c1 to c8 are obtained in the first stage as shown in FIG. 4.

Figure 10:
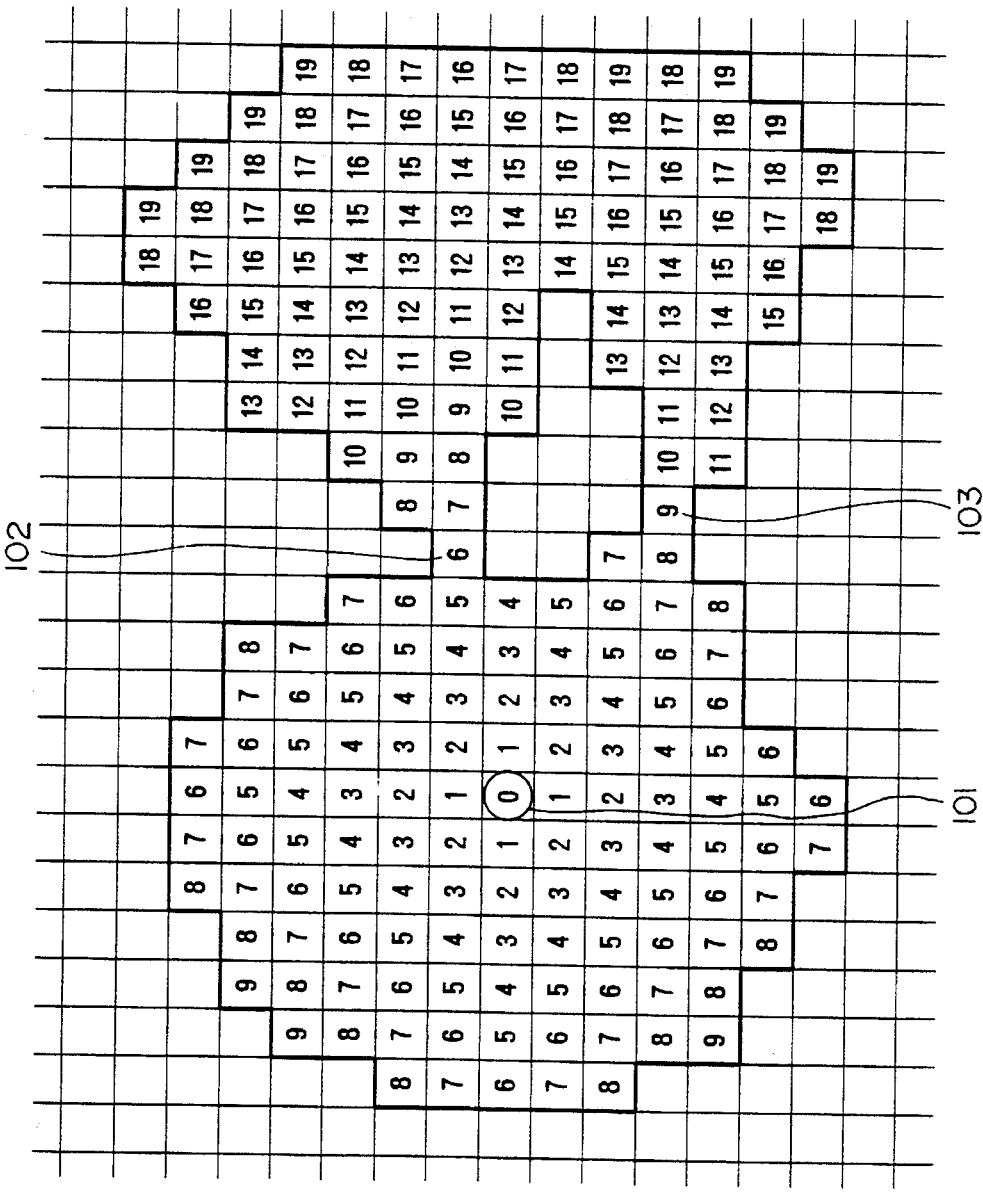
FIG. 10 is a diagram showing alternative original image data for explaining the operation.

(6) In a case where a plurality of overflow regions produced from two or more connection parts overlap with each other, it is impossible to simultaneously identify the connection parts. In this situation, when two or more expansion regions are to be processed, one of the expansion regions is selected to achieve the region expansion for the connection part. The method and advantageous effect of this function will be additionally described in the final part of this article by reference to alternative original image data (FIG. 10).

(7) The connection part is identified depending on a change in the number of expansion points in the region expansion. In this processing, since the expansion is achieved through locations in the following sequence as an overflow region, a connection part, and an objective region in any case, the number of expansion points is first increased in the overflow region and is then reduced in the connection part. Finally, the number is increased in the objective region. Table 1 shows the change in the number of expansion points created in the respective expansion stages for the data of FIG. 1. The number of expansion points is decreased or converged in the extraction stages 6 and 5. This consequently implies that the expansion point passes a connection part.

TABLE 1

| Change in number of children generated | | | | | | | | |
|---|---|---|---|---|---|---|---|---|
| Child extraction stage | 11 | 10 | 9 | 8 | 7 | 6 | 5 | 4 | 3 |
| Number of children generated | 8 | 5 | 5 | 4 | 2 | 1 | 1 | 17 | 12 |

Depending on the state of the connection part, the number of expansion points is not necessarily 1. However, as a result of the recursive expansion, the number of expansion points characteristically increased abruptly after the processing passes through the connection part, and hence the connection part can be identified also by checking the change in the number of expansion points (time series data; reference is made to FIG. 5).

Figure 6:
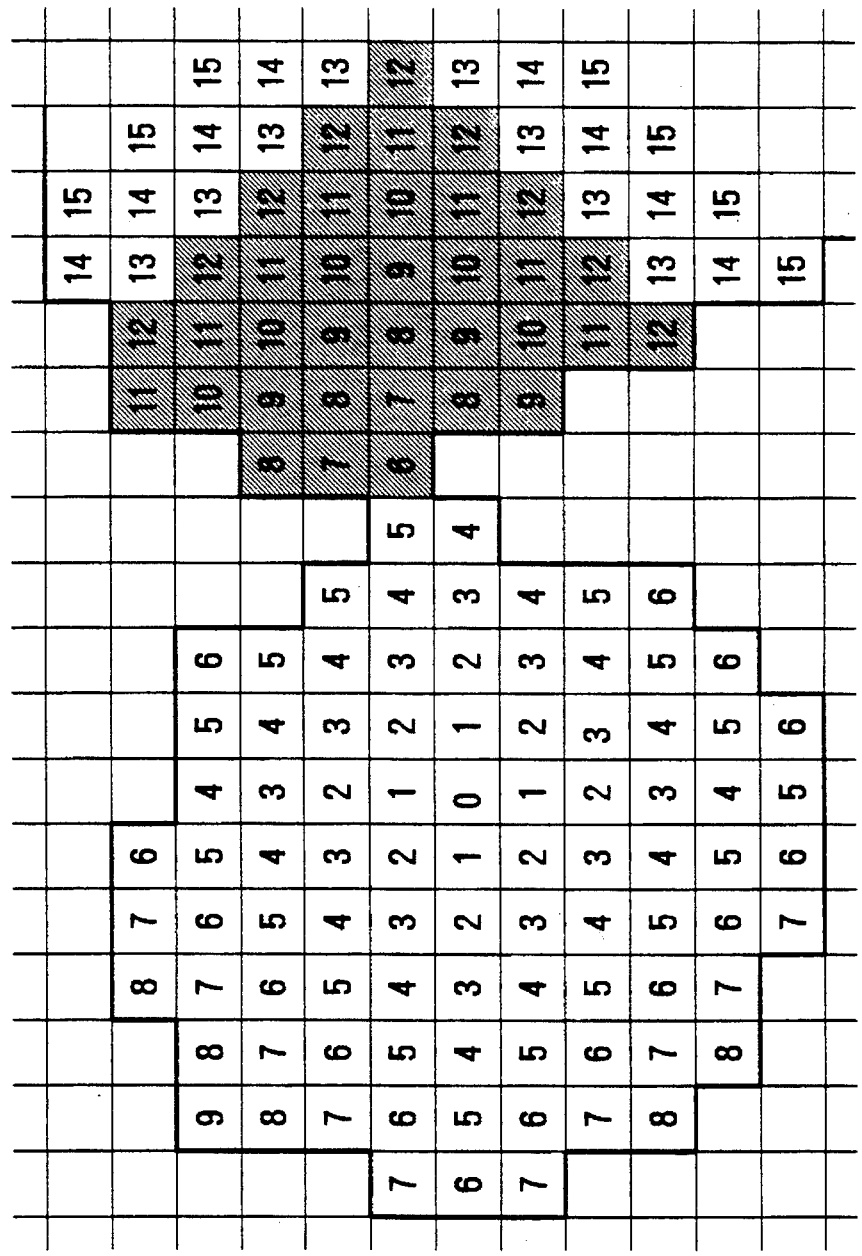
FIG. 6 is a diagram showing an extraction region extracted up to a point where a connection point is reached.
Figure 7:
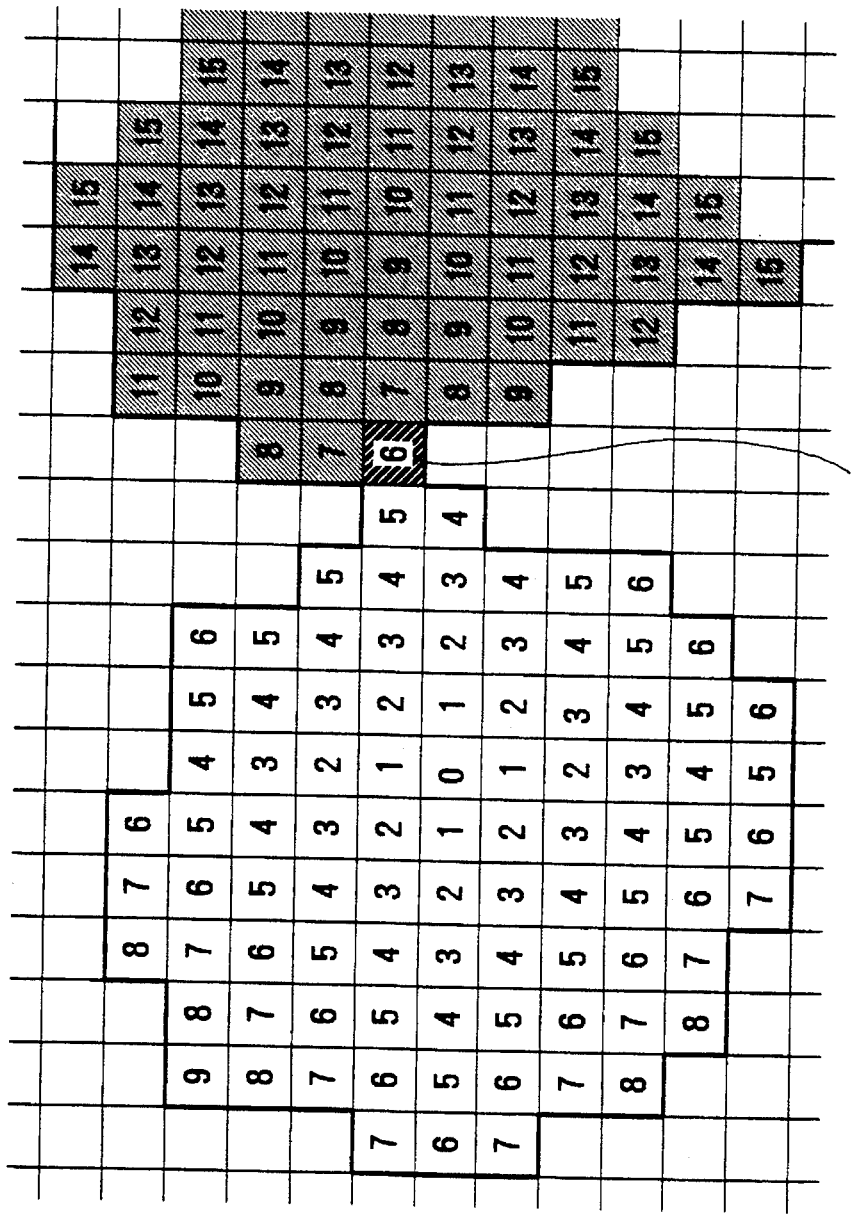
FIG. 7 is an explanatory diagram for explaining a deletion region extraction method according to a region expansion from a connection point.

(8) The shadowed region of FIG. 6 is the extraction region attained by the region expansion. As can be seen from this diagram, this extraction region includes only a region ranging from the indication point specified by the function of operation (3) above to the connection part. In this situation, the entire overflow region is extracted by achieving another region expansion from the connection part as follows. When the extraction stage of the point adjacent to the expansion origin is greater than that of the expansion point by one, the adjacent point is set as a new expansion point for the region expansion processing. FIG. 7 shows a result obtained by the region extraction processing.

(9) In a case where a wrong point is indicated in the overflow region or where the connection point cannot be successfully identified, the extraction result attained by the operation of operation (8) above is different from that resulting from the operation achieved on the actual overflow region. To overcome this difficulty, there is disposed a function, namely, prior to actually deleting the region, the region extracted by the function of operation (8) is clearly indicated in the three-dimensional display image so that the operator confirms the region thus indicated by observing the displayed region. If the overflow region is appropriate, the deletion processing of operation (10) below is carried out; otherwise, the result is canceled to conduct again the overflow extraction processing from the step of operation (3).

(10) After the result is confirmed as described in operation (9), the overflow region is deleted. However, once the data is actually deleted, it is impossible thereafter to restore the original state thereof. To cope with this situation, there is adopted in this case a method in which an attribute of an invisibility region is assigned to the pixel without deleting the data. That is, the pixel data is retained, but it is not displayed.

Figure 8:
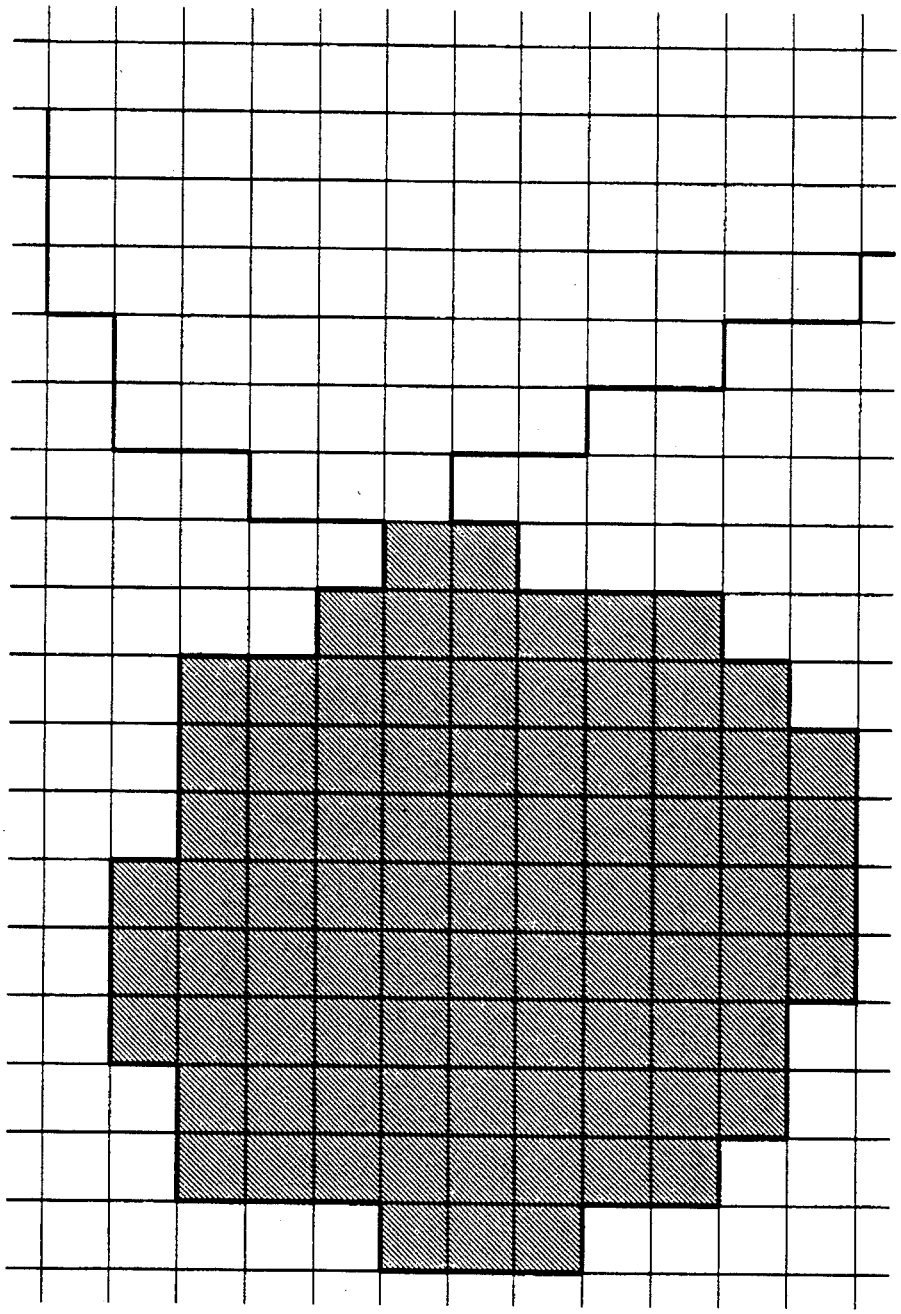
FIG. 8 is a diagram showing a final extraction result.

(11) When there exist a plurality of overflow regions, the extraction processing of the objective region described in operation (1) and the overflow region extraction and deletion of operations (2) to (10) are repeatedly carried out to sequentially delete overflow regions, thereby attaining the final extraction result (FIG. 8).

Figure 9:
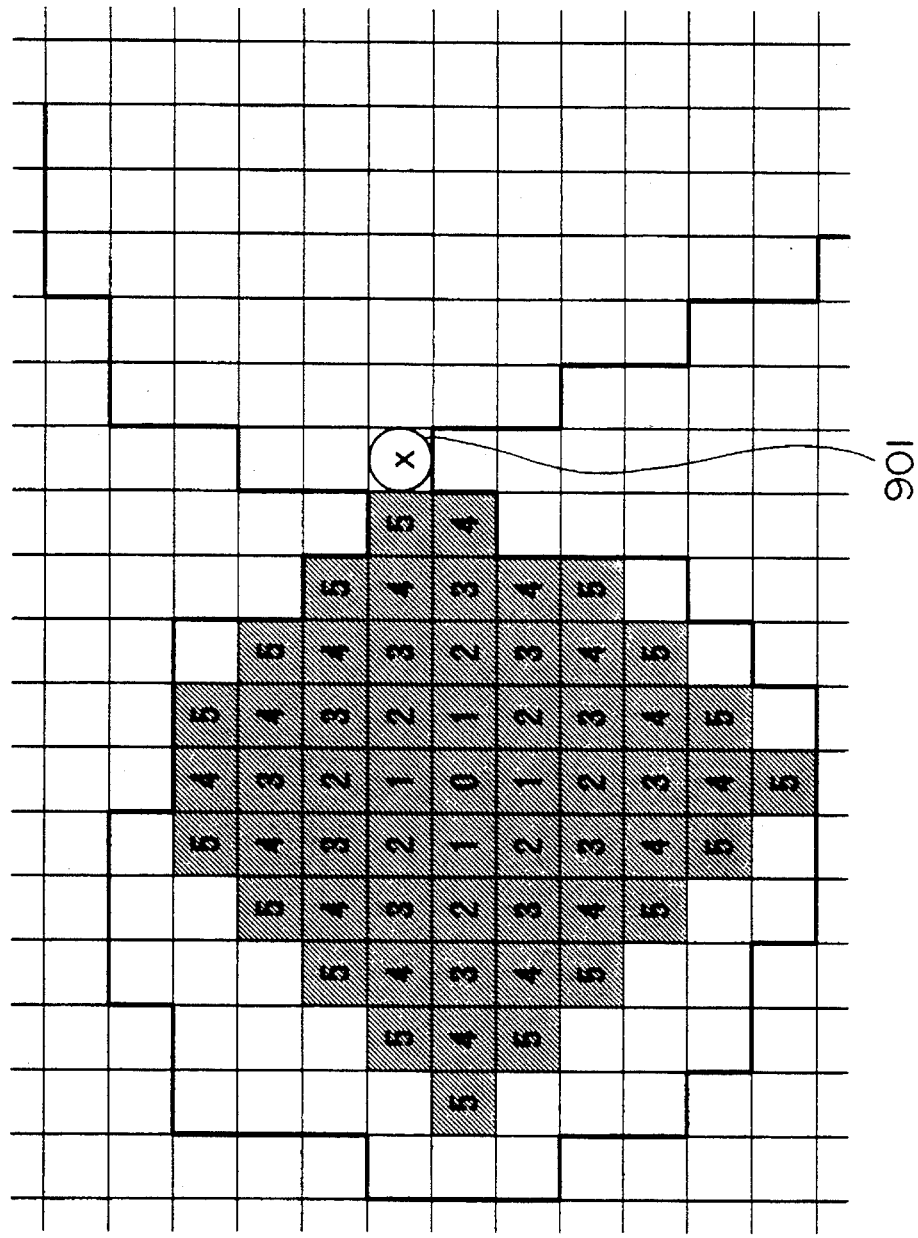
FIG. 9 is a diagram showing an extraction region in an extraction stage in which a connection point appears.

(12) There may also be considered an alternative method as follows. Through the processing steps of operations (8) to (10), namely, without deleting the entire overflow region, only the connection points are deleted and then the region expansion is again accomplished in the objective region from a point in time immediately preceding the point of occurrence of the connection point. FIG. 9 shows the extraction region at an extraction point immediately before the occurrence of the connection point. Since the connection point (901) has already been deleted, even if the region expansion is again conducted from this point in time, there does not occur any overflow and the obtained extraction result becomes substantially identical to that shown in FIG. 8.

Finally, a supplemental description will be given of the function of operation (6) by reference to FIGS. 10 to 12.

In a case where the region expansion of operation (1) is effected for the actual data, a plurality of overflow occurs in many cases. FIG. 10 shows extraction history data developed when two overflows take place. Two connection parts 102 and 103 exist in this diagram.

When these overflow regions are separated from each other, the respective connection points can be identified without executing the processing of operation (6). However, as shown in FIG. 10, when the overflow regions grow resultantly into a region, the extraction point varies between the connection points. Consequently, the number of expansion points does not converge and hence it is impossible to identify the connection point.

To remove this disadvantage, when there appear two separated overflow regions, an operation to find connection points are achieved in one of the separated regions. After the processing is completed in this region, the search for a connection point is conducted through the remaining region.

Figure 11:
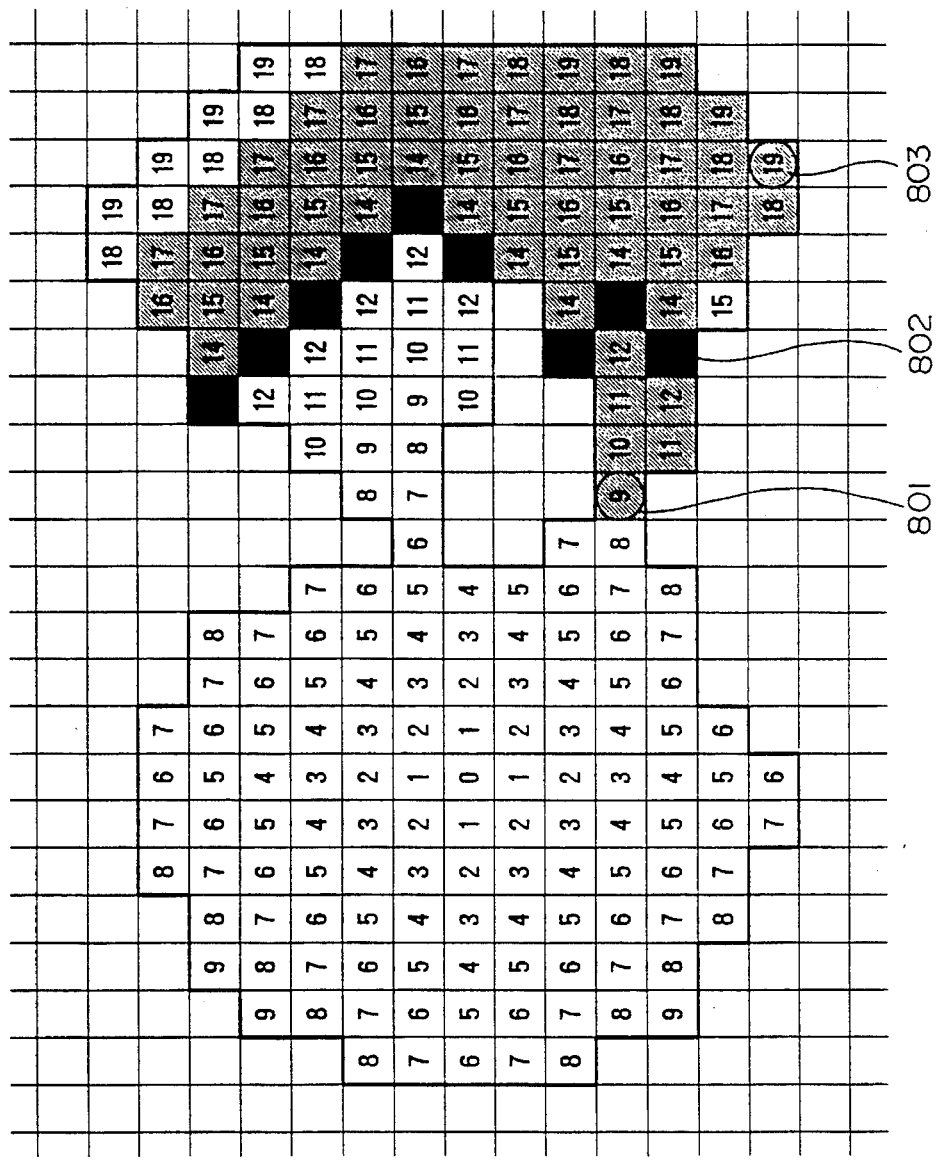
FIG. 11 is an explanatory diagram for explaining a connection point search processing conducted for the original data of FIG. 10.

FIG. 11 shows a state of the region expansion effected on the data of FIG. 10. In this diagram, numeral 803 denotes an expansion start point and a shadowed region designates an expansion region. In an extraction stage 13, the region 802 (indicated by a darker block) associated with expansion points are separated into two regions. In this situation, the lower region nearer to the expansion start point 803 is selected to continue the expansion processing on this region, thereby extracting a connection point 801.

Figure 12:
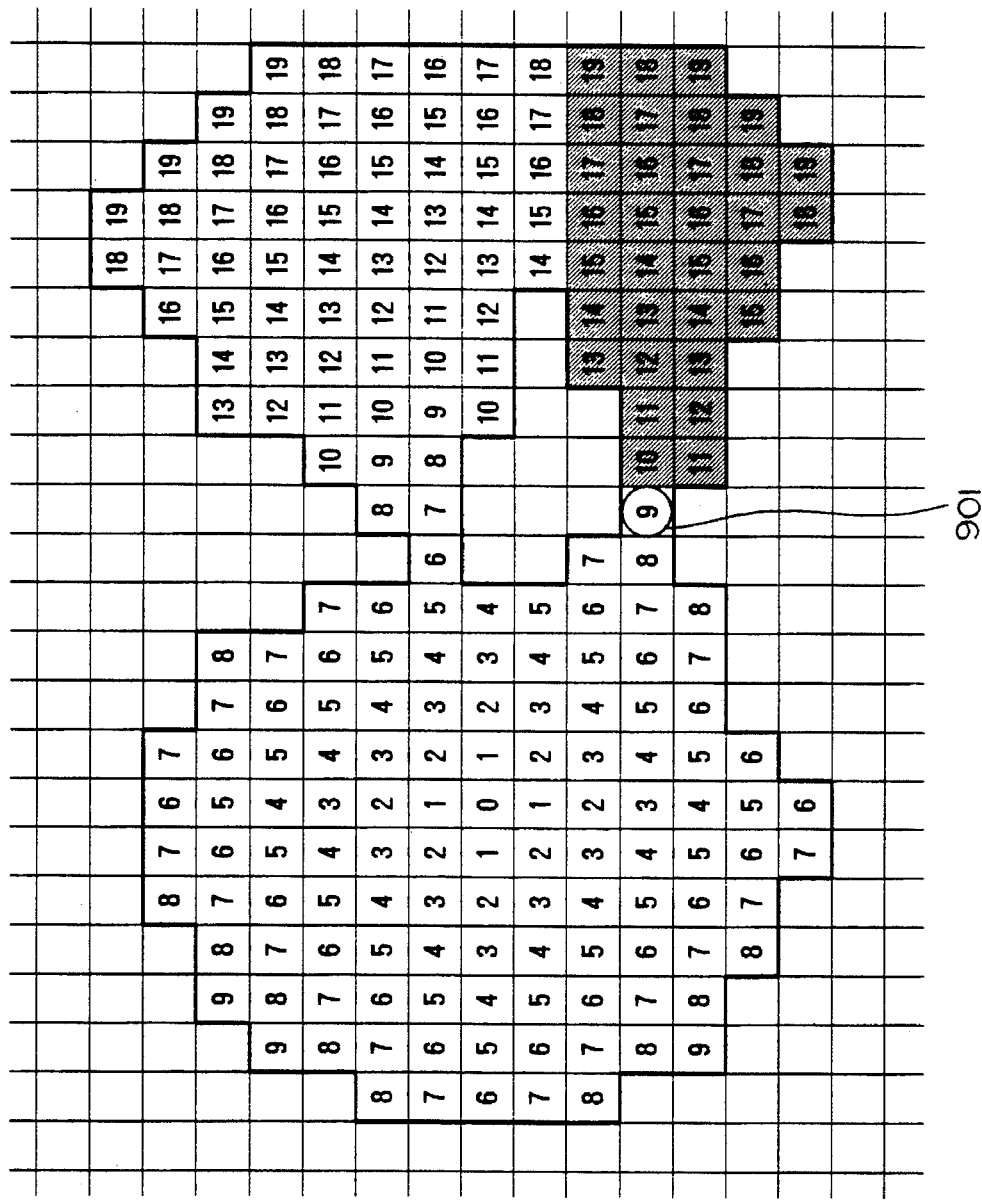
FIG. 12 is an explanatory diagram useful for explaining an overflow region extraction processing effected for the original data of FIG. 10.

In FIG. 12, shadowed portions are regions thus extracted by the expansion processing of operation (7) from the connection point. After the regions are removed, the similar operations including the connection point search and region deletion processing are achieved to the remaining upper region, thereby extracting the objective region.

Referring next to drawings, description will be given in detail of an embodiment according to the present invention.

The first embodiment of the present invention will be described by reference to FIGS. 13 to 16.

In this embodiment, there is employed a method related to extracting an objective region from intra-body three-dimensional voxel data attained by a three-dimensional shooting by an MRI system.

Figure 13:
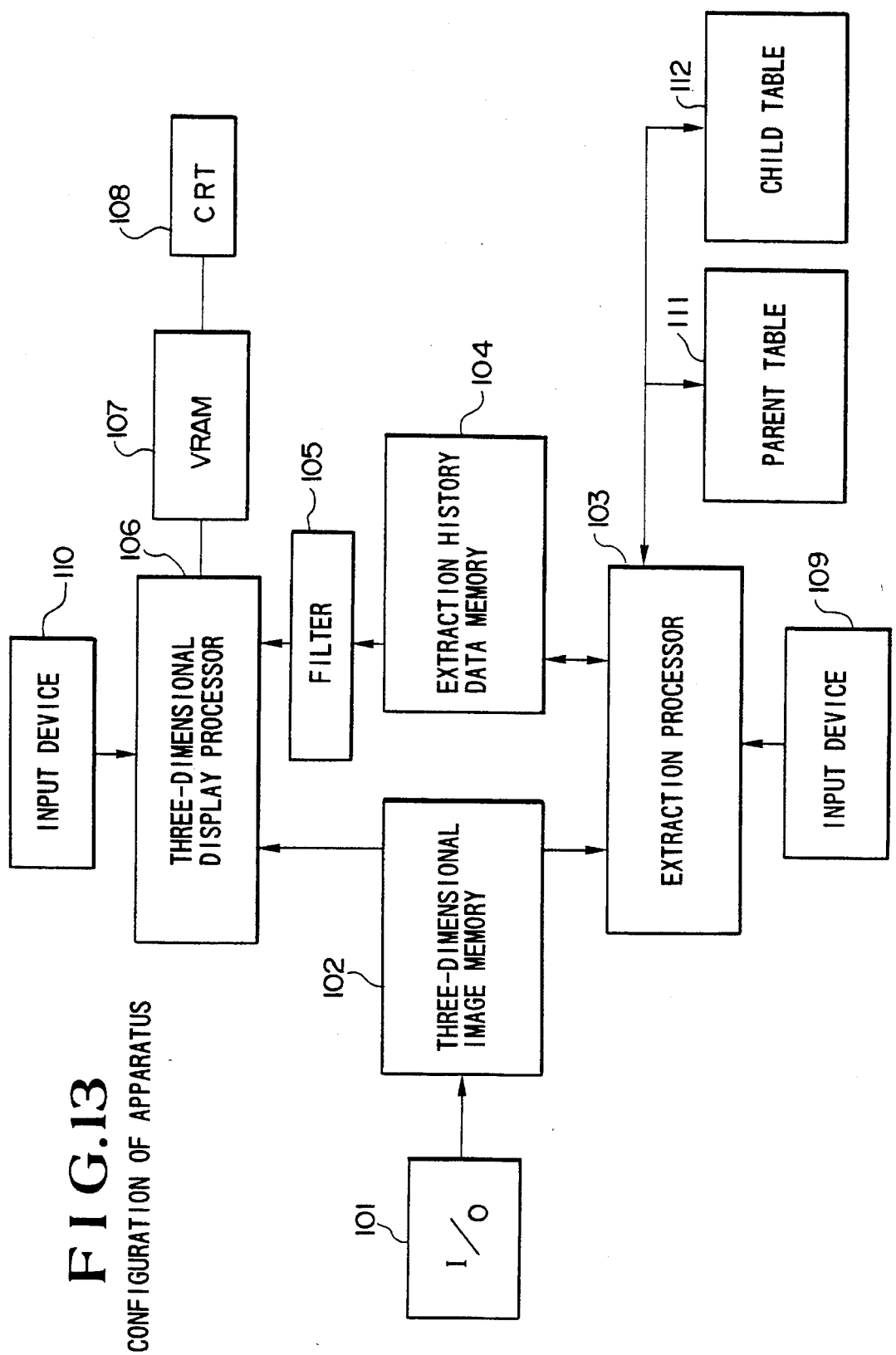
FIG. 13 is a diagram showing an example of the constitution of a system to which the present invention is applied.

FIG. 13 shows an example of the configuration of a system to which the present invention is applied. This apparatus processes three-dimensional voxel data attained through a three-dimensional image shooting operation of an MRI apparatus to extract an image of a particular internal organ therefrom. In FIG. 13, a straight line with an arrow mark designates a data transmission path and the arrow mark denotes a direction of data flowing between the respective units.

The three-dimensional voxel data attained by the MRI system is sent from an I/O device 101 to this apparatus to be stored in a three-dimensional image memory 102. An extraction processor 103 references data in the three-dimensional image memory 102 to obtain an objective region to be extracted according to the concatenated region expansion method. A parent table 111 and a child table 112, which are connected to the extraction processor 103, are adopted as work areas for the region extraction processing. An extraction result is stored in an extraction history data memory 104 as information denoting a serial extraction number for each voxel of the three-dimensional voxel data. Consequently, the extraction history data memory 104 has a size identical to that of the three-dimensional image memory 102 and a one-to-one correspondence is established between the elements respectively thereof. At an arbitrary point of the extraction, an extraction result can be obtained by delivering information stored in the extraction history data memory 104 to a filter 105. A three-dimensional display processor 106 generates, based on the data in the three-dimensional image memory 102 and data output from the filter 105, three-dimensional image data of the extraction region at an arbitrary extraction point so as to store the image data in a VRAM 10. The data is displayed as a three-dimensional display image on a CRT 108.

An input device 109 is utilized to set a concatenation judging condition, to set an extraction starting point, to cause an interruption in an expansion processing, and to indicate an overflow region to be deleted. An input device 110 for the three-dimensional display processor 106 is employed to input such items as a rendering parameter and a position of point of view, which are used in the three-dimensional display computation.

Figure 14:
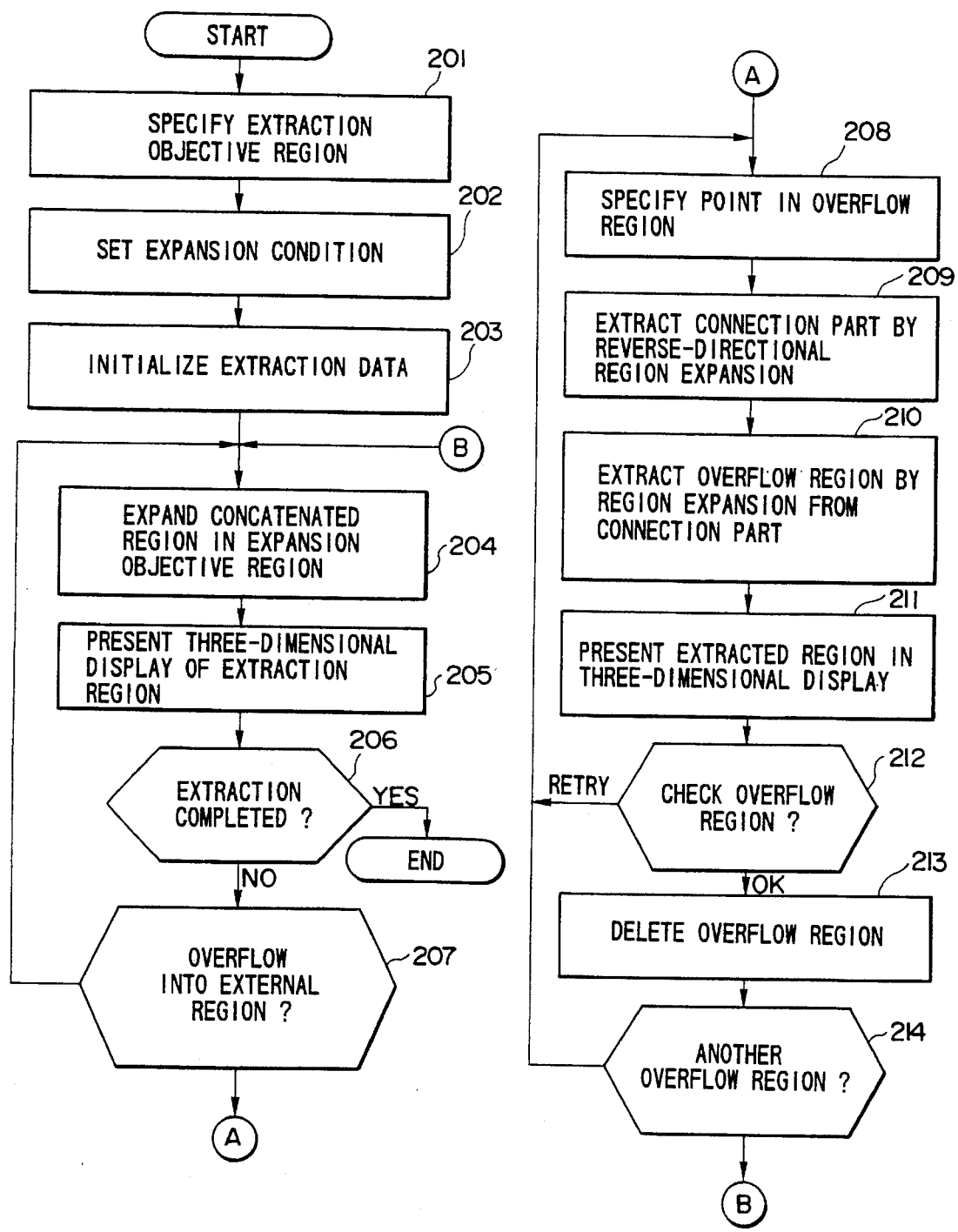
FIG. 14 is a flowchart showing the operation of a first embodiment according to the present invention.

FIG. 14 shows an outline of the region extraction processing executed in accordance with the present invention.

Referring next to the system configuration diagram of FIG. 13 and the flowchart of FIG. 14, description will be given of the outline of the region extraction processing of the present invention.

[Step 201]

For specification of an extraction region, coordinates of a point or a plurality of points existing in a region to be extracted are input via the input device 109. The coordinates input in this step denote a starting point in the concatenated region expansion processing to be executed in a step 203 and subsequent steps.

[Step 202]

A reference for judging a concatenation feature (to be referred to as "an expansion condition" herebelow) for the concatenated region expansion is input via the input device 109. In the concatenated region expansion of the present invention, an extraction of the objective region and an extraction/deletion of the overflow region are repeatedly conducted to obtain a final extraction result. Consequently, the expansion condition need not necessarily be an optimized condition. However, it is possible, by setting an appropriate condition, to reduce the human power required for the operations thus repeatedly achieved. It is also effective to combine a plurality of conditions with each other for the expansion condition as described in operation 2 above.

[Step 203]

The extraction result is stored and the extraction history data memory 104 is initialized.

[Step 204]

The extraction processor 103 sets as the expansion condition the parameter input in the step 201 so as to conduct the extraction processing according to the concatenated region expansion method beginning from the expansion starting point input in the step 201. The stage of the concatenated region expansion processing is completed when all of the current expansion starting points (to be referred to as "parents" herebelow) generate, in their adjacent regions, expansion points (to be referred to as "children" herebelow) satisfying the expansion condition. After the stage of the concatenated region expansion is finished, the extraction processor 103 writes, for each "child", an extraction result. Namely, the serial expansion stage number of generation of the "child" relative to the extraction starting point is stored in the three-dimensional extraction data memory 104 at a position indicated by coordinates corresponding to the "child".

[Step 205]

The rendering processor 106 continuously references data of the extraction history data 104 updated in the step 204 to generate a three-dimensional display image of the extraction region at the current extraction stage in the VRAM 107, thereby displaying the image on the CRT 108. The position of point of view and the display parameter can be altered when necessary via the input device 110.

[Step 206]

In a stage of the region expansion, when there is missing a new "child" to be generated, the concatenated region expansion is automatically finished at that point in time. The extraction history data 104 at this point is the final result of the region extraction. On the other hand, in a case where the overall objective region is not completely extracted, namely, when a "child" is being generated in the step 204, the expansion processing is repeatedly carried out with the "children" set as expansion points (parents).

[Step 207]

The operator evaluates the three dimensional display image of the extraction region generated in the step 205. In a case where an overflow into the external region is clearly recognized in the three-dimensional display image, the extraction of the objective region is temporarily stopped and control is passed to an overflow region deletion routine beginning from the step 208. If there does not exist any problem, control is returned to the step 204 to continue the extraction of the objective region.

[Step 208]

A point is specified in the overflow region to be deleted. In order to specify a point in the region for the three-dimensional voxel data, there is generally used a method in which a cross section thereof is selected to specify a point on the cross section. However, the following step is used in this example. In the the concatenated region expansion for an overflow region, the starting point may be an arbitrary point in the region. Taking advantage thereof, an overflow region is specified on the three-dimensional display image.

[Step 209]

A concatenation part between the overflow region and the objective region is extracted according to the concatenated region expansion method. Detailed description of this step will be given later in conjunction with steps 301 to 308 and steps 401 to 412.

[Step 210]

The entire overflow region is deleted according to a third region expansion method beginning from the connection point extracted in the step 209.

[Step 211]

The overflow region attained in the step 210 is superimposed onto the three-dimensional image of the overall extraction region generated in the step 205, thereby displaying the resultant image. In this operation, there may be adopted a display method in which, for example, different colors are used for the respective regions to facilitate discrimination therebetween.

[Step 212]

The operator checks the three-dimensional display image created in the step 211 to evaluate the overflow region extracted by the operation up to the step 210. If there does not exist any problem, the subsequent step is achieved to delete the region; otherwise, control is returned to the step 208 to again achieve the overflow region extraction.

[Step 213]

The region extracted as an overflow region is deleted. However, as described in conjunction with the operation of the present invention, once the data itself is erased, it is impossible to re-execute the same processing on the data or to extract another region existing in the pertinent region. In this example, to overcome this difficulty, an attribute of invisibility region is simply assigned to the pixels in the objective region. That is, the pixel data is retained, but it is not displayed.

[Step 214]

The operator again evaluates the three-dimensional display image after the deletion processing of the step 213 so as to decide presence or absence of any other overflow region therein. If an overflow region is found, control is passed to the step 208 to extract the overflow region. If there is missing the overflow region or if such a region is still too small to be recognized as an overflow region, control is returned to the step 204 to again start the extraction of the objective region.

Figure 15:
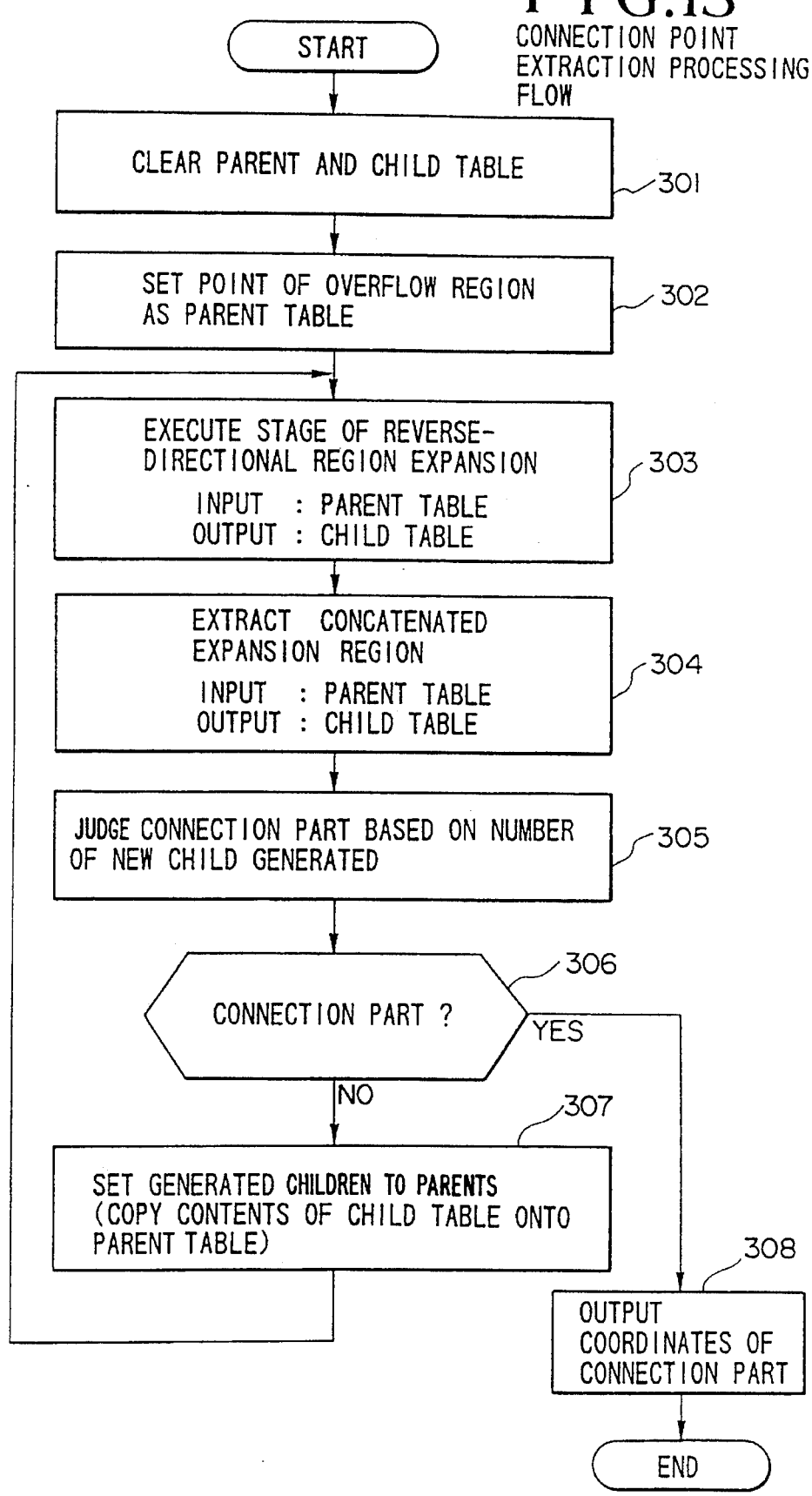
FIG. 15 is a flowchart of the connection point extraction processing according to the present invention.

Next, referring to the construction diagram of FIG. 13 and the flowchart of FIG. 15, description will be given of a method of extracting the connection region according to a second (reverse-directional) region expansion in the step 209 of the flowchart of FIG. 14.

In this connection, a "parent" and a "child" used in the following description respectively denote a point of an expansion origin in a region expansion and an expansion point produced from the "parent". Furthermore, a "parent table" is adopted to store therein coordinates of all "parents" created in a stage of the region expansion. Coordinates of "children" generated from "parents" through the region expansion are sequentially stored in a "child table".

[Step 301]

The parent table 111 and the child table 113 are initialized.

[Step 302]

A point in the deletion region specified in the step 208 is registered as the first "parent" in the parent table 111.

[Step 303]

A check is made for all "parents" registered to the parent table 111 to attain adjacent points thereof, thereby registering adjacent points satisfying the expansion condition as "children" to the child table 112. The expansion processing will be described in detail in conjunction with steps 401 to 412 later.

[Step 304]

A check is made for the concatenation feature of regions associated with the "children" generated in the step 303. When the region is to be subdivided into a plurality of regions, one of the subdivided regions is selected to register pixels existing therein as real "children" again in the child table 112.

[Step 305]

The number of "children" produced in the step 304 is checked to determine a connection part based on the number or a change in the number. For this purpose, there may be adopted various methods, for example, a method in which the mean values before and after each point in time are compared with each other or a method in which a point in time when the variance varies greatly is utilized.

[Step 306]

When the connection part is identified, the region expansion is terminated and then control is passed to the connection part output processing in a step 308. If the expansion region has not reached the connection part, control is passed to a step 307 to continue the region expansion.

[Step 307]

Each "child" thus produced is set as a "parent", namely, the new region thus expanded is used as an expansion origin in the subsequent region expansion. This is achieved by moving the contents of the child table 112 to the parent table 111. Control is then returned to the step 303 to conduct the next stage of region expansion.

[Step 308]

Coordinates of the "child" obtained at a point of time when the connection part is identified are output as coordinates of the connection part. After the connection point output is finished, control is transferred to the step 210 to conduct the overflow region extraction.

Figure 16:
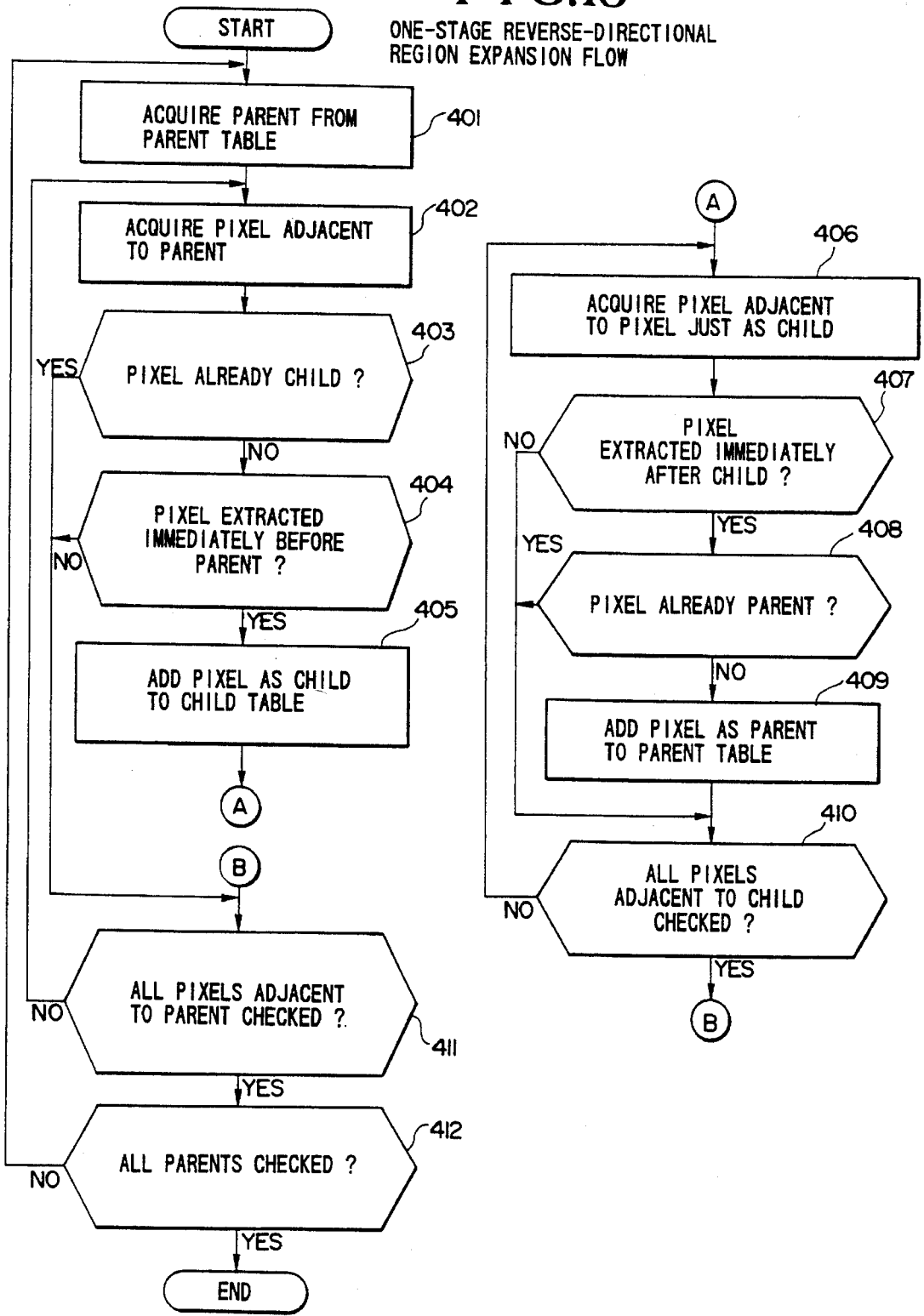
FIG. 16 is a flowchart showing a reverse-directional region expansion according to the present invention.

Next, referring to the flowchart of FIG. 16, description will be given in detail of the region expansion of the step 303.

[Step 401]

A "parent" is acquired from the parent table 111.

[Step 402]

A pixel adjacent to the "parent" is obtained. In this example, there exist six adjacent pixels including those respectively existing at positions above and beneath the "parent" and on the right and left sides thereof.

[Step 403]

The "child" table 112 is referenced to decide whether or not the attained adjacent pixel has already been registered to the "child" table 112.

[Step 404]

The extraction history data is referenced so as to compare the extraction stage of the "parent" with that of the obtained adjacent pixel.

[Step 405]

In a case where it is found, as a result of the steps 403 and 404, that the attained adjacent pixel has not yet registered to the "child" table and the serial stage number of the adjacent pixel is less than that of the "parent" by one in the first region expansion of the step 404, the adjacent pixel is registered as a "child" to the child table 112.

[Step 406]

Pixels adjacent to the "child" registered to the "child" table 112 in the step 405 are acquired. As in the step 402, there are assumed six adjacent pixels of the "child" in the vertical and horizontal directions.

[Step 407]

The "parent" table is referenced to determine whether or not the attained adjacent pixel has already been registered to the "parent" table 111.

[Step 408]

The extraction history data is referenced to compare the extraction stage of the "child" with that of the obtained adjacent pixel.

[Step 409]

As a result of the steps 407 and 408, if the attained adjacent pixel has not yet registered to the "parent" table and the serial stage number of the adjacent pixel is less than that of the "child" by one in the first region expansion, the adjacent pixel is registered as a "parent" to the child table 111.

[Step 410]

Until all pixels adjacent to the "child" are completely checked, the steps 406 to 409 (addition and registration of "parent") are repeatedly executed.

[Step 411]

Until all pixels adjacent to the "parent" are completely checked, the steps 402 to 410 (registration of "child") are repeatedly achieved.

[Step 412]

Until all pixels adjacent to all "parents" in the parent table 111 are completely checked, the steps 401 to 412 are repeatedly executed.

According to the above embodiment, with the minimized human operations, the region extraction can be accomplished on the three-dimensional voxel data attained from an MRI apparatus. More specifically, in a region extraction by a concatenated region expansion suitable for a considerably large volume of three-dimensional voxel data, most portions of the extraction region correction job, which is achieved by the human power in the conventional technology, can be automatically carried out. This accordingly realizes practical use of the internal-organ extraction processing on medical three-directional voxel data, which cannot be easily put to practical use in the prior art.

Figure 17:
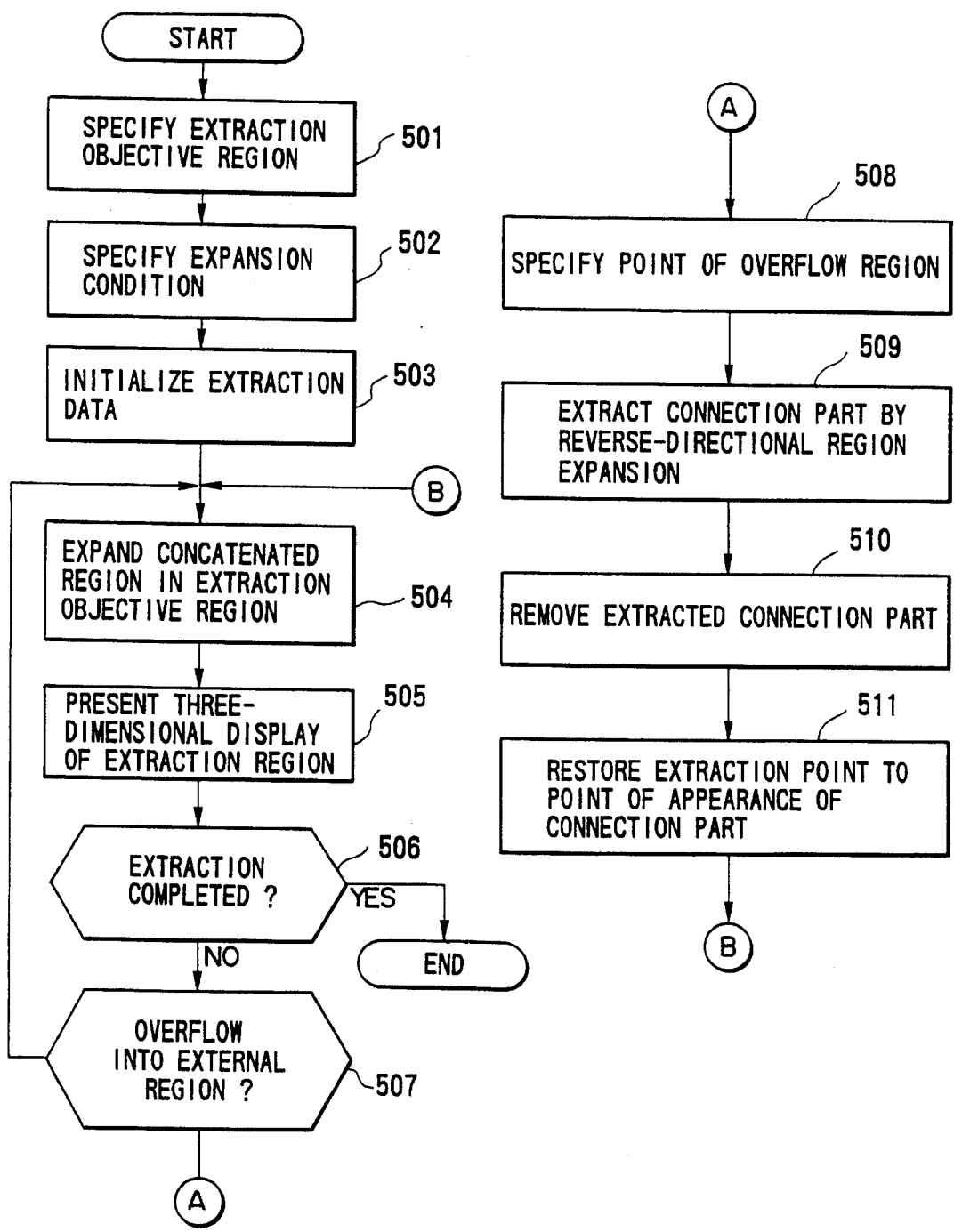
FIG. 17 is a flowchart showing the operation of a second embodiment according to the present invention.

Next, referring to the flowchart of FIG. 17, description will be given of a second embodiment according to the present invention.

Like in the first embodiment, an objective region is extracted in the second embodiment. However, the processing to be accomplished after the extraction of the connection part remarkably varies therebetween. In this connection, since steps 501 to 509 of FIG. 17 are almost identical to those of the first embodiment, description thereof will be avoided.

[Steps 501 to 509]

Description will be accordingly avoided (reference is to be made to the steps 201 to 207 of the first embodiment).

[Step 510]

The connection part extracted in the step 509 is removed from the data. Moreover, in place of the operation of achieving the data removal, the system may conduct an operation to set an attribute of an expansion inhibition point to the data.

[Step 511]

The extraction point is restored to the point where the connection part has been detected. As a result, all overflow regions are set as non-extraction regions. At the same time, a portion of the objective region is also set as a non-extraction region. FIG. 9 shows the extraction region developed on the data of FIG. 1 when the extraction point is restored to the point where the connection part is detected (extraction point 5). A letter "x" designates a connection point extracted in the step 509 such that this point is assigned with the expansion inhibition attribute.

After the steps 510 and 511 are finished, the concatenated region expansion is started again in the extraction region beginning from the step 204.

Since the connection part to the overflow region has already been removed in the step 210, there does not occur any overflow as a result of the expansion. Namely, only the objective region is extracted.

The embodiment is attended with problems, for example, a problem of a double extraction in which an objective region once extracted is subjected to an extraction again and a problem that there is missing means for confirming an overflow region. However, since only the connection part is deleted in this embodiment, there is attained an advantageous feature of preventing the wrong operation in which the objective region is mistakenly erased.

Figure 18:
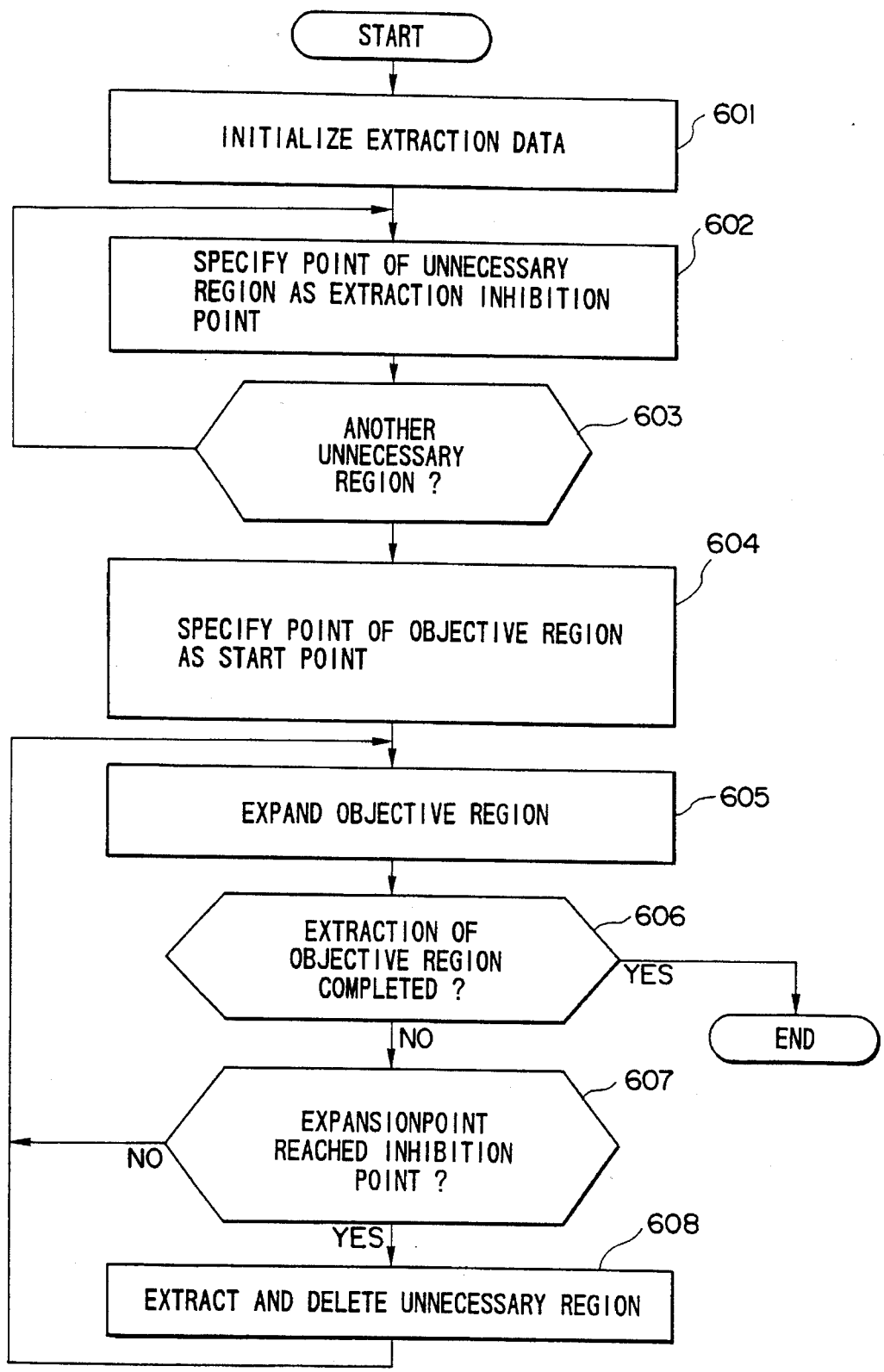
FIG. 18 is a flowchart showing the operation of a third embodiment according to the present invention.

Next, referring to the system constitution diagram of FIG. 13 and the flowchart of FIG. 18, description will be given of a third embodiment in accordance with the present invention.

According to this embodiment, an extraction inhibition point or region is set in the three-dimensional voxel data prior to the region extraction, thereby automatically achieving the extraction of the objective region. This embodiment is implemented for a medical application in which a brain region and a skin region are assumed to be the objective region and the extraction inhibition region, respectively.

[Step 601]

The extraction history data memory is initialized.

[Step 602]

The operator requests the system to display a cross section including a region to be set as an unnecessary extraction region. At least one point of the region is specified in the image of the cross section and then the point is stored as an extraction inhibition point in the extraction history data memory.

[Step 603]

When there exists another region to be set as an unnecessary extraction region, control is returned to the step 602 to continuously achieve the specification of an extraction inhibition point. If the unnecessary region exists spatially over the objective region in this embodiment, namely, the objective region is covered with the unnecessary region (for example, when the brain region and the skin region are assumed to be the objective region and the extraction inhibition region, respectively), it may also be possible, by scanning the three-dimensional voxel data from a peripheral portion to a central portion thereof, to automatically set the extraction inhibition points.

[Step 604]

The operator requests the apparatus to display a cross section including the objective region and then specifies a point of the objective region in the displayed cross section. The point is stored as an extraction starting point in the parent table 111.

[Step 605]

The object region is extracted through the concatenated region expansion. The region extraction is accomplished in the method described in conjunction with the step 204 of the first embodiment.

[Step 606]

At a point where it is impossible to expand the region, the extraction processing is stopped and then an extraction result is output.

[Step 607]

When the expansion point reaches the extraction inhibition point established in the step 602, the objective region extraction is terminated.

[Step 608]

An unnecessary region is extracted by the region expansion described in conjunction with the first embodiment in which the extraction points are traced in the reverse direction from the extraction inhibition point reached in the step 607, thereby deleting the unnecessary region. After the unnecessary region is deleted, control is returned to the step 605 to achieve again extraction of the objective region by the concatenated region expansion.

As described in detail above, according to the present invention, there is obtained an advantageous effect of implementing a method of and an apparatus for processing multi-dimensional data capable of minimizing the human operation required to be conducted during the extraction processing to guarantee reliability of the extraction.

While particular embodiments of the invention have been shown and described, it will be obvious to those skilled in the art that various changes and modifications may be made without departing from the present invention in its broader aspects.

We claim:

1. A region extracting method, said method comprising the steps of:

executing a concatenated region expansion process on objective multi-dimensional data to extract a desired region from said objective multi-dimensional data, said concatenated region expansion process starting from one or more data points extracted in said desired region and including repetition of an expansion substep in which time series data indicating a transition of the number of data points having connectivity with each other is set and a plurality of data points are incorporated into said extracted data points when said plurality of data points are adjacent to previously incorporated data points and satisfy expansion criteria;

displaying the incorporated extracted data points on a display screen;

inversely tracing said concatenated region expansion process, when the incorporated extracted data points overflow the desired region into an external region, by using said time series data indicating the transition of the number of data points having connectivity with each other;

identifying a connection part between the desired region and an overflow region of said incorporated data points on the basis of said time series data, said overflow region being located outside of the desired region; and deleting the overflow region according to the connection part from the incorporated extracted data points.

2. A region extraction method comprising the steps of:

extracting a region including a desired region from multi-dimensional data, by a concatenated region expansion processing;

displaying said extracted region on a display screen;

executing reverse-order tracing processing, when said extracted region overflows the desired region into an external region, for tracing expansion points extracted at each time stage in said concatenated region expansion processing in an order opposite that of said concatenated region expansion processing, thereby identifying a connection part between the desired region and an overflow region of said extracted region, said overflow region being located outside of said desired region; and deleting the overflow region from the extracted region according to the connection part so as to obtain only said desired region.

3. A method according to claim 2, wherein said reverse-order tracing processing step includes the steps of:

determining a number of expansion points being connected to each other and extracted at each time stage in said concatenated region expansion; and identifying expansion points as the connection part when the number of the expansion points becomes equal to or less than a preset value.

4. A method according to claim 2, wherein said reverse-order tracing processing step includes the steps of:

calculating a characteristic feature of time series data including data items indicating a number of the expansion points extracted at each time stage in said concatenated region of expansion processing;

identifying, based on the characteristic time series data feature, timing as to when said overflow region appears; and determining positions of expansion points which are extracted at said timing as the connection point.

5. A method according to claim 2, wherein said step of deleting the overflow region includes the steps of deleting the connection part from the extracted region and executing a concatenated region expansion processing again from a first point or an intermediate point of the extracted region, thereby extracting the desired region.

6. A method according to claim 2, wherein said step of deleting the overflow region includes the steps of executing a region expansion in a direction from the connection part to the overflow region, thereby extracting the entire overflow region.

7. A method according to claim 2, wherein said overflow region extraction processing includes the steps of:

displaying the overflow region in a three-dimensional display manner; and requesting an operator for confirmation of, based on a result of the display, whether or not a deletion of the overflow region is to be conducted.

8. A region extracting apparatus comprising:

means for extracting, from three-dimensional voxel data, a desired region by use of a concatenated region expansion processing;

means for storing extraction history data indicating, for each voxel region extracted by said extracting means, a time stage when said voxel region is extracted in said concatenated region processing;

three-dimensional display processing means for referencing the extraction history data and the three-dimensional voxel data and thereby outputting a three-dimensional display image of the extracted voxel region, including the desired region, at an arbitrary time;

indicating means for indicating a point in an overflow region which overflows the desired region into an external region and obtaining coordinates thereof;

identifying means for achieving an identifying operation from the indicated point in the overflow region by reverse-order tracing of said concatenated region expansion processing on the extraction history data, thereby identifying a connection part between the overflow region and the desired region in the extracted voxel region; and means for deleting the overflow region from the extracted voxel region in accordance with the connection part so as to obtain only said desired region.

9. An apparatus according to claim 8, wherein said deleting means includes means for achieving the concatenated region expansion processing on the three-dimensional voxel data from which the connection part is thus deleted, thereby executing the extraction processing so as to obtain only said desired region.

* * * * *